(12) United States Patent
Weng et al.

(10) Patent No.: US 10,209,853 B2
(45) Date of Patent: Feb. 19, 2019

(54) SYSTEM AND METHOD FOR DIALOG-ENABLED CONTEXT-DEPENDENT AND USER-CENTRIC CONTENT PRESENTATION

(71) Applicants: Robert Bosch GmbH, Stuttgart (DE); Fuliang Weng, Mountain View, CA (US); Kui Xu, Sunnyvale, CA (US); Fei Liu, Palo Alto, CA (US); Lin Zhao, Sunnyvale, CA (US); Zhe Feng, Mountain View, CA (US); Zhongnan Shen, Milpitas, CA (US)

(72) Inventors: Fuliang Weng, Mountain View, CA (US); Kui Xu, Sunnyvale, CA (US); Fei Liu, Palo Alto, CA (US); Lin Zhao, Sunnyvale, CA (US); Zhe Feng, Mountain View, CA (US); Zhongnan Shen, Milpitas, CA (US)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 15/104,695

(22) PCT Filed: Dec. 11, 2014

(86) PCT No.: PCT/US2014/069692
§ 371 (c)(1),
(2) Date: Jun. 15, 2016

(87) PCT Pub. No.: WO2015/194891
PCT Pub. Date: Jun. 25, 2015

(65) Prior Publication Data
US 2016/0313868 A1    Oct. 27, 2016

Related U.S. Application Data

(60) Provisional application No. 61/919,377, filed on Dec. 20, 2013.

(51) Int. Cl.
*G06F 3/0481* (2013.01)
*G06F 9/451* (2018.01)
(Continued)

(52) U.S. Cl.
CPC ............ *G06F 3/0481* (2013.01); *B60K 35/00* (2013.01); *G06F 3/017* (2013.01);
(Continued)

(58) Field of Classification Search
CPC ...................................................... G06F 3/048
See application file for complete search history.

(56) References Cited

U.S. PATENT DOCUMENTS 7,716,056 B2     5/2010   Weng et al.
2003/0036848 A1  2/2003   Sheha et al.
(Continued)

FOREIGN PATENT DOCUMENTS

EP    1219927 A2      7/2002
KR    10-0646732 B1   11/2006
(Continued)

OTHER PUBLICATIONS

Supplementary European Search Report corresponding to European Patent Application No. 14 87 2078 (8 pages).
(Continued)

*Primary Examiner* — Pei Yong Weng
(74) *Attorney, Agent, or Firm* — Maginot Moore & Beck LLP

(57) ABSTRACT

An in-vehicle infotainment system, smart home information access and device control unit, or mobile system presents summarized information to a user based on a user preference model that is associated with the user. The system modifies the presentation of information to the user based on environmental context data about the vehicle and user context data about the activity of the user. During presentation of the
(Continued)

information, the system modifies the content and presentation of the summarized information in response to multimodal input requests from the user.

12 Claims, 10 Drawing Sheets

(51) Int. Cl.
| | | |
|---|---|---|
| *G06F 3/01* | (2006.01) | |
| *G06Q 30/02* | (2012.01) | |
| *G10L 15/22* | (2006.01) | |
| *G06F 3/0488* | (2013.01) | |
| *B60K 35/00* | (2006.01) | |
| *H04L 29/06* | (2006.01) | |
| *H04L 29/08* | (2006.01) | |

(52) U.S. Cl.
CPC .......... *G06F 3/04883* (2013.01); *G06F 9/451* (2018.02); *G06Q 30/02* (2013.01); *G10L 15/22* (2013.01); *H04L 65/4069* (2013.01); *H04L 67/12* (2013.01); *B60K 2350/1028* (2013.01); *B60K 2350/1044* (2013.01); *B60K 2350/1052* (2013.01); *B60K 2350/2052* (2013.01); *B60K 2350/901* (2013.01); *B60K 2350/962* (2013.01); *G06F 2203/0381* (2013.01)

(56) References Cited

U.S. PATENT DOCUMENTS

| | | | |
|---|---|---|---|
| 2003/0167172 A1* | 9/2003 | Johnson | G06F 17/30899 704/270.1 |
| 2007/0055652 A1* | 3/2007 | Hood | G06F 17/30864 |
| 2013/0188927 A1 | 7/2013 | Seryakov et al. | |
| 2013/0211710 A1 | 8/2013 | Kennewick et al. | |
| 2013/0275164 A1 | 10/2013 | Gruber et al. | |
| 2014/0168277 A1* | 6/2014 | Ashley | G06F 3/1446 345/672 |

FOREIGN PATENT DOCUMENTS

| | | |
|---|---|---|
| KR | 10-2012-0120316 A | 11/2012 |
| WO | 2011079462 A1 | 7/2011 |
| WO | 2012/153290 A1 | 11/2012 |

OTHER PUBLICATIONS

International Search Report corresponding to PCT Application No. PCT/US2014/069692, dated Mar. 31, 2015 (4 pages).

\* cited by examiner

SYSTEM AND METHOD FOR DIALOG-ENABLED CONTEXT-DEPENDENT AND USER-CENTRIC CONTENT PRESENTATION

CLAIM OF PRIORITY

This application is a 35 U.S.C. § 371 National Stage Application of PCT/US2014/069692, filed on Dec. 11, 2014, which claims the benefit of claims priority to U.S. Provisional Application No. 61/919,377, which is entitled "System And Method For Dialog-Enabled Context-Dependent And User-Centric Content Presentation," and was filed on Dec. 20, 2013, the disclosures of which are hereby incorporated by reference herein.

CROSS-REFERENCE

This patent cross-references U.S. Pat. No. 7,716,056, which is entitled "Method and system for interactive conversational dialogue for cognitively overloaded device users," and was filed on Sep. 27, 2004, the entire contents of which are hereby incorporated by reference herein.

FIELD

This disclosure relates generally to the field of automated information retrieval and, more specifically, to systems and methods for the retrieval and summarization of text data based on the context of a user who requests the text data.

BACKGROUND

Spoken language is the most natural and convenient communication tool for people. Advances in speech and language technology have allowed an increased use of spoken language interfaces with a variety of different machines and computer systems. Interfaces to various systems and services through natural voice requests offer people convenience and efficiency in accessing variety of information from internet selectively. This is especially important for applications in eye-busy and hand-busy situations, such as driving a car or performing sophisticated computing tasks. Human machine interfaces that utilize spoken commands and voice recognition are generally based on dialog systems. A dialog system is a computer system that is designed to converse with a human using a coherent structure and text, speech, graphics, or other modalities of communication on both the input and output channel. Dialog systems that employ speech are referred to as spoken dialog systems and generally represent the most natural type of human machine interface. With the ever-greater reliance on electronic devices, spoken dialog systems are increasingly being implemented in many different systems.

In many human-machine interaction (HMI) systems, users can interact with the system through multiple input devices or types of devices, such as through voice input, gesture control, and traditional keyboard/mouse/pen inputs. This provides user flexibility with regard to data input and allows users to provide information to the system more efficiently and in accordance with their own preferences.

Present HMI systems typically limit particular modalities of input to certain types of data, or allow the user to only use one of multiple modalities at one time. For example, a vehicle navigation system may include both a voice recognition system for spoken commands and a touch screen. However, the touch screen is usually limited to allowing the user to select certain menu items by contact, rather than through voice commands. Such multi-modal systems do not coordinate user commands through the different input modalities, nor do they utilize input data for one modality to inform and/or modify data for another modality. Thus, present multi-modal systems do not adequately provide a seamless user interface system in which data from all possible input modalities can be used to provide accurate information to the system.

One common example of an HMI is the interface that a motor vehicle presents to a user and other occupants in the vehicle. Modern motor vehicles often include one or more in-vehicle information systems that provide a wide variety of information and entertainment options, which are referred to as "infotainment" in this document, to occupants in the vehicle. Common services that are provided by the in-vehicle infotainment systems include, but are not limited to, vehicle state and diagnostic information, navigation applications, hands-free telephony, radio and music playback, and traffic condition alerts. In-vehicle infotainment systems often include multiple input and output devices. For example, traditional buttons and control knobs that are used to operate radios and audio systems are commonly used in vehicle infotainment systems. More recent forms of vehicle input include touchscreen input devices that combine input and display into a single screen, as well as voice-activated functions where the in-vehicle infotainment system responds to voice commands. Examples of output systems include mechanical instrument gauges, output display panels, such as liquid crystal display (LCD) panels, and audio output devices that produce synthesized speech. The system state information, also called vehicle context information, can be useful to decide when, what, and how to select and/or present internet information to the driver or vehicle occupants.

In-vehicle infotainment systems operate using either minimally interactive or fully interactive information services. Minimally interactive services include many traditional systems such as in-vehicle radios and music playback devices. In a minimally interactive service, the user has a small degree of input over the content, such as selecting a radio station or changing audio tracks for pre-recorded music playback. The user has little or no control of the content in a minimally interactive service. Fully interactive services give the user much more control over the selection of information. Examples of fully interactive services include, for example, web browsers, interactive chat and communication applications, social networking applications, news, sports, and the like. Fully interactive services provide the user with a greater degree of flexibility, but many fully interactive services are unsuitable for use while the vehicle is in motion. The fully interactive services tend to be more complex than minimally interactive services, and a user cannot use the full-interactive services effectively while operating the vehicle. Consequently, improvements to HMIs and digital information systems that provide more flexibility to the user than the minimally interactive systems while also reducing the complexity of fully interactive systems would be beneficial.

SUMMARY

A content presentation system identifies content of interest to a user and presents the content to the user based on predetermined preferences for the user, contextual data about the current state of the user, and contextual data about the environment around the user. The system is also configured to collect user requests in a natural (multi-modal) and dynamic way and identify the user intent based on domain knowledge and user model to update the content or mode of presentation for the information in an interactive manner. The system clarifies user intent in different aspects, including topics, authors, information sources, viewpoints, political bias, level of details, specific figures/people, entities, or events. The system identifies and extracts the relevant content according to user intent. The system organizes, summarizes, and presents the extracted content according to user intent. The system includes the advanced multi-modal dialog subsystem to collect user intent of information needs via multi-step conversational dialogs where the users may initially express some vague ideas and the system will guide the users to obtain very much desired information content. The multimodal dialog system uses knowledge bases in the domain of information, including news about political, social, community, commercial, business, science, technology, military, sports, daily life, social network, or friends. The system is configured to present a default level of detail for different information topics, and the user can request that the system present information with a greater or lesser degree of detail in an interactive manner.

In one embodiment, a content presentation system has been developed. The content presentation system includes a network device configured to retrieve information from a plurality of information sources through a data network, a memory configured to store a user preference model corresponding to a user of the content presentation system, an output device, and a processor operatively connected to the network device, the memory, and the output device. The processor being configured to retrieve information from the plurality of information sources corresponding to a plurality of predetermined topics with reference to the user preference model, generate a plurality of summarized presentations of the information for each topic in the plurality of topics, and generate an output with the output device for each of the plurality of summarized presentations for the plurality of topics with the output device in a predetermined format for the user with reference to the user preference model.

In another embodiment, a method of presenting content in a content presentation system has been developed. The method includes retrieving with a network device information from a plurality of information sources corresponding to a plurality of predetermined topics with reference to a user preference model stored in a memory, generating with a processor a plurality of summarized presentations of the information for each topic in the plurality of topics, and generating with the processor an output for each of the plurality of summarized presentations for the plurality of topics with an output device in a predetermined format for a user with reference to the user preference model.

DETAILED DESCRIPTION

Figure 1:
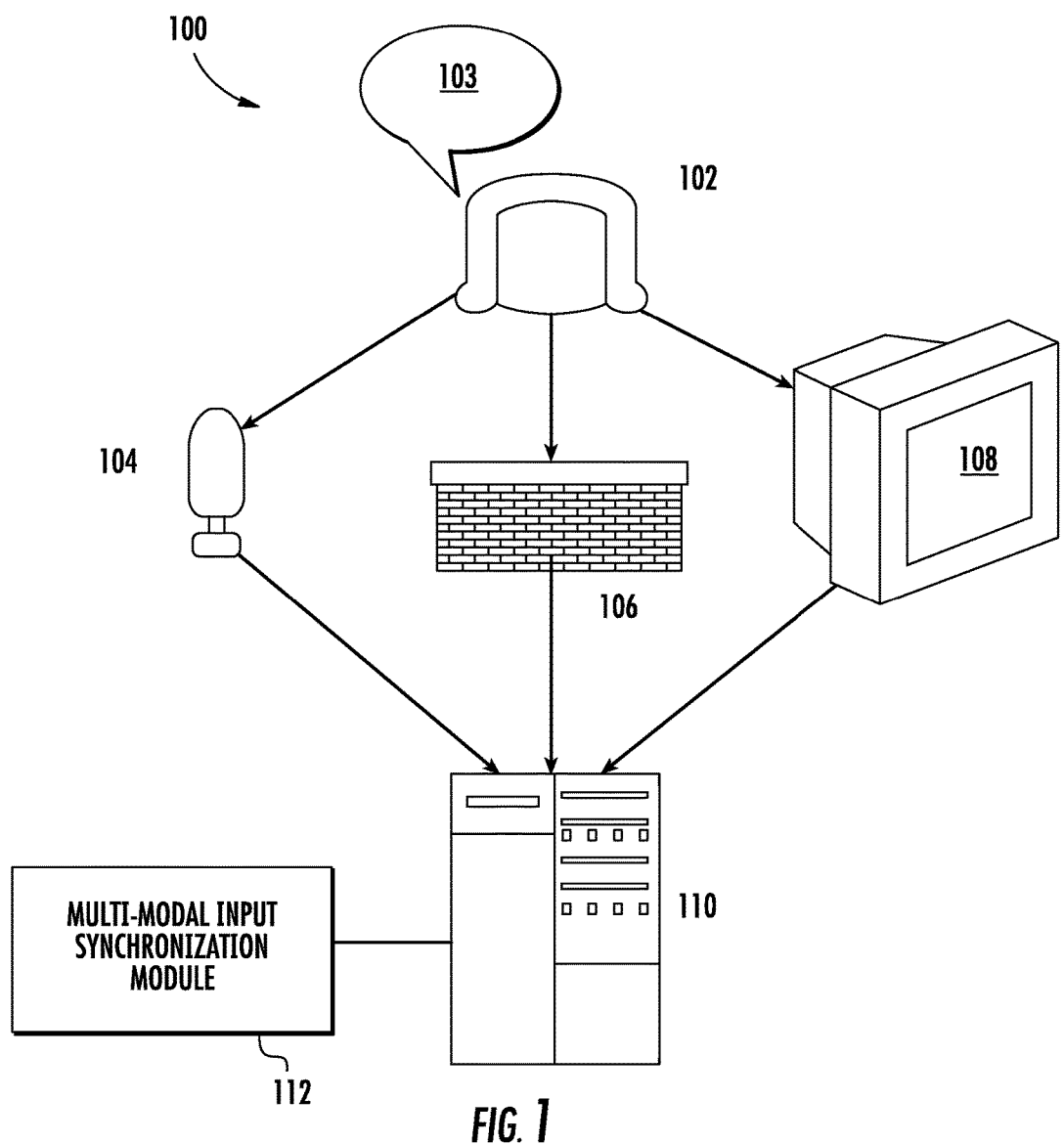
FIG. 1 illustrates a multi-modal human-machine system, that implements a multi-modal synchronization and disambiguation system, according to an embodiment.

For the purposes of promoting an understanding of the principles of the embodiments disclosed herein, reference is now being made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "gesture" includes any movement by a human user that corresponds to an input for control of a computing device, including an in-vehicle parking assistance service. While not a requirement, many gestures are performed with the hands and arms. Examples of gestures include pressing one or more fingers on a surface of a touch sensor, moving one or more fingers across a touch sensor, or moving fingers, hands, or arms in a three-dimensional motion that is captured by one or more cameras or three-dimensional sensors. Other gestures include head movement or eye movements. As used herein, the term "gesture input device" refers to any device that is configured to sense gestures of a human user and to generate corresponding data that a digital processor or controller interprets as input to control the operation of software programs and hardware components, particularly hardware components in a vehicle. Many gesture input devices include touch-sensitive devices including surface with resistive and capacitive touch sensors. A touchscreen is a video output devices that includes an integrated touch sensor for touch inputs. Other gesture input devices include cameras and other remote sensors that sense the movement of the user in a three-dimensional space or sense movement of the user in contact with a surface that is not otherwise equipped with a touch sensor. Embodiments of gesture input devices that are used to record human-machine interactions are described below.

Embodiments of a dialog system that incorporates a multi-modal synchronization and disambiguation system for use in human-machine interaction (HMI) systems are described. Embodiments include a component that receives user inputs from a plurality of different user input mechanisms. The multi-modal synchronization and disambiguation system synchronizes and integrates the information obtained from different modalities, disambiguates the input, and recovers from any errors that might be produced with respect to any of the user inputs. Such a system effectively addresses any ambiguity associated with the user input and corrects for errors in the human-machine interaction.

In the following description, numerous specific details are introduced to provide a thorough understanding of, and enabling description for, embodiments of the multi-modal synchronization and disambiguation system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

FIG. 1 illustrates a multi-modal human-machine system, that implements a multi-modal synchronization and disambiguation system, according to an embodiment. In system 100, a user 102 interacts with a device 110, which may be a computing system, machine, or any automated electromechanical system. The user can provide input to device 110 through a number of different modalities, typically through voice or touch controls through one or more input means. These include, for example, keyboard or mouse input 106, touch screen or tablet input 108, and/or voice input 103 through microphone 104. Other means of user input are also possible, such as foot controls, keypads, joystick/servo controls, game-pad input, infrared or laser pointers, camera-based gesture input, electromagnetic sensors, and the like. Different user inputs may control different aspects of the machine operation. In certain instances, a specific modality of input may control a specific type of operation. For example, voice commands may be configured to interface with system administration tasks, and keyboard input may be used to perform operational tasks. In one embodiment, the user input from the different input modalities are used to control at least certain overlapping functions of the device 110. For this embodiment, a multi-modal input synchronization module 112 is used to synchronize and integrate the information obtained from different input modalities 104-108, disambiguate the input, and use input from any modality to correct, modify, or otherwise inform the input from any other modality.

As shown in FIG. 1, in many human-machine interaction (HMI) systems, users can interact with system via multiple input devices, such as touch screen, mouse, keyboard, microphone, and so on. The multi-modal input mechanism provides user flexibility to input information to the system more efficiently any through their preferred method. For example, when using a navigation system, a user may want to find a restaurant in the area. He or she may prefer specifying the region through a touch screen interface directly on a displayed map, rather than by describing it through speech or voice commands. In another example, when a user adds a name of contact into his address book, it may be more efficient and convenient to say the name directly than by typing it through a keyboard or telephone keypad.

Users may also use multiple modalities to achieve their tasks. That is, the machine or an aspect of machine operation may accept two or more modalities of user input. In some cases, a user may utilize all of the possible modalities of input to perform a task. The multi-modal synchronization component 112 allows for the synchronization and integration of the information obtained from different modalities. The different inputs can be used to disambiguate the responses and provide error recovery for any problematic input. In this manner, users can utilize input methods that are most desired, and are not always forced to learn different input conventions, such as new gestures or commands that have unique meanings.

Unlike traditional multi-modal HMI systems that only allow the user to use one of multiple modalities at one time, the multi-modal synchronization component allows the user to input information via multiple modalities at the same time. For example, the user can speak to the system while drawing something on the touch screen. Thus, in a navigation system, the user can utter "find a restaurant in this area" while drawing a circular area on a map display on a touch screen. In this case, the user is specifying what is meant by "this area" through the touch screen input. The determination of the meaning of a user's multi-modal input would depend on the information conveyed in different modalities, the confidence of the modalities at that time, as well as the time of the information received from the different modalities.

Figure 2:
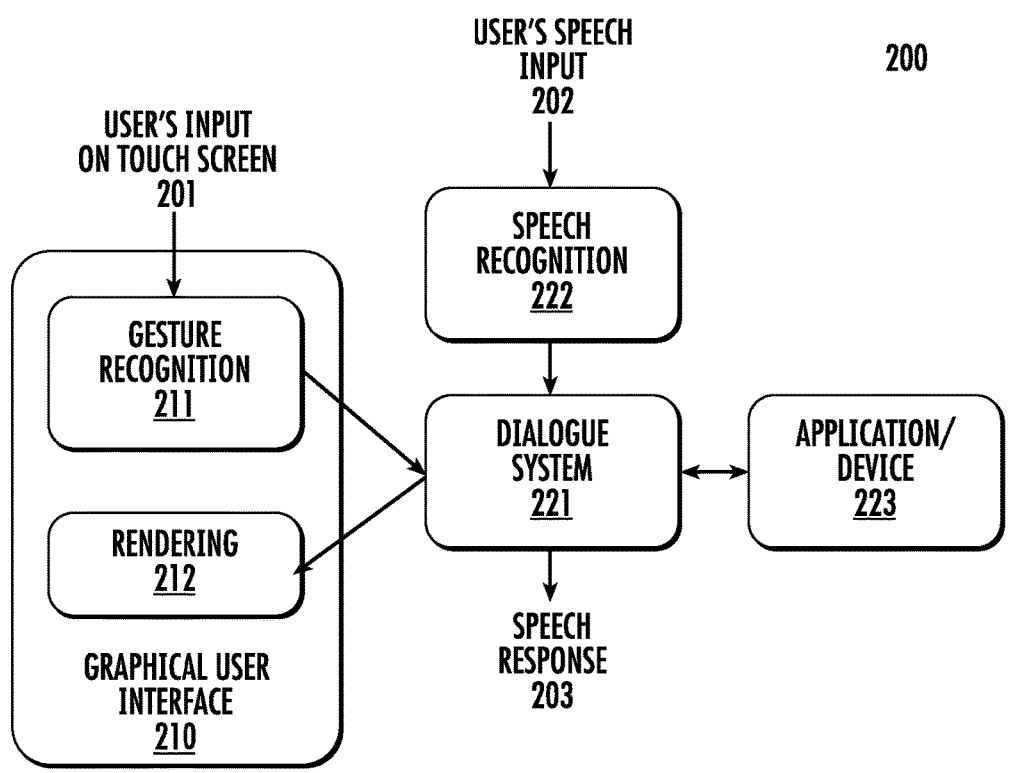
FIG. 2 is a block diagram of a multi-modal user interaction system that accepts a user's gesture and speech as inputs and that includes a multi-modal synchronization and disambiguation system, according to an embodiment.

FIG. 2 is a block diagram of a multi-modal user interaction system that accepts user's gesture and speech as input. In a multi-modal user interaction system 200, a user can input information by typing, touching a screen, saying a sentence, or other similar means. Physical gesture input, such as touch screen input 201 is sent to a gesture recognition module 211. The gesture recognition module will process the user's input and classify it into different types of gestures, such as a dragging action, or drawing a point, line, curve, region, and so on. The user's speech input 202 will be sent to a speech recognition module 222. The recognized gesture and speech from the corresponding gesture recognition module and the speech recognition module will be sent to the dialog system 221. The dialog system synchronizes and disambiguates the information obtained from each modality based on the dialog context and the temporal order of the input events. The dialog system interacts with the application or device 223 to finish the task the user specified via multi-modal inputs. The output of the interaction and the results of the executed task are then conveyed to the user through a speech response 203 and/or are displayed through a rendering module 212 on a graphical user interface (GUI) 210. The system 200 of FIG. 2 may be used to perform the input tasks provided in the example above of a user specifying a restaurant to find based on a combination of speech and touch screen input.

A primary function of the multi-modal user interaction system is to distinguish and synchronize user input that may be directed to the same application. Different input modalities may be directed to different tasks, even if they are input at the same time. Similarly, inputs provided by the user at different times through different modalities may actually be directed to the same task. In general, applications and systems only recognize user input that is provided through a proper modality and in the proper time period.

Figure 3:
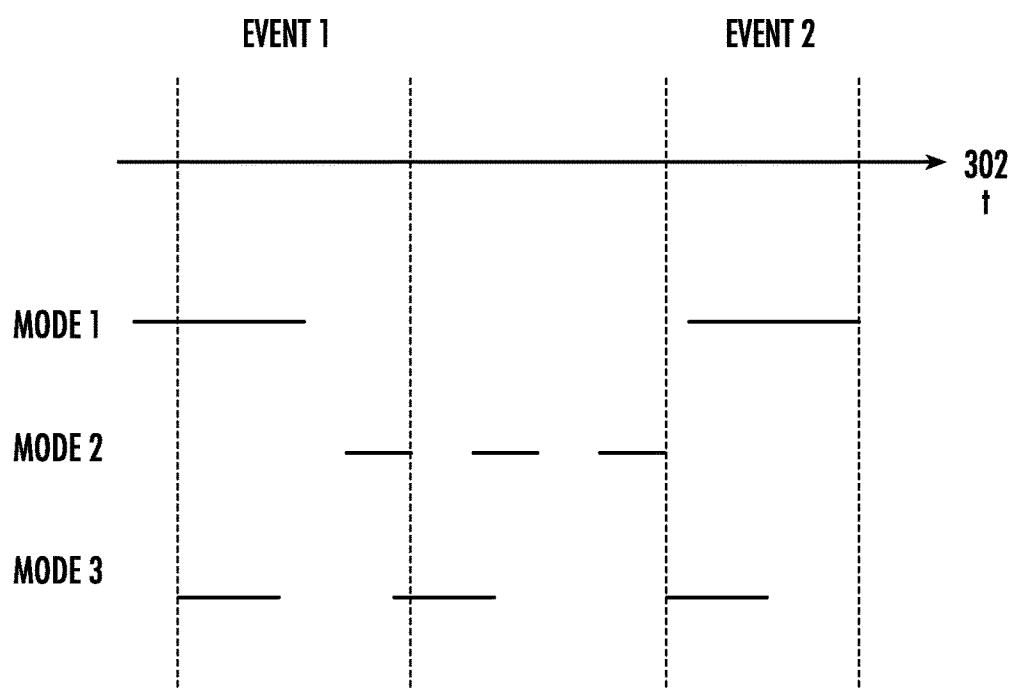
FIG. 3 illustrates the processing of input events using a multi-modal user interaction system, under an embodiment.

FIG. 3 illustrates the processing of input events using a multi-modal user interaction system, under an embodiment. As shown in FIG. 3, the horizontal axis 302 represents input events for a system along a time axis. Two example events are illustrated as denoted "event 1" and "event 2". The input events represent valid user input periods for a specific application or task. Three different input modalities denoted modalities 1, 2, and 3, are shown, and can represent a drawing input, a spoken input, a keyboard input, and so on. The different input modalities have user inputs that are valid at different periods of time and for varying durations. For event 1, the user has provided inputs through modalities 1, 2, and 3, but modality 2 is a relatively short and late input. Similarly for event 2, modalities 1 and 3 appear to have valid input, but modality 2 may be early or nonexistent. The multi-modal interaction system may use information provided by any of the modalities to determine whether a particular input is valid, as well as help discern the proper meaning of the input.

The system can also ask for more input from various modalities when the received information is not enough in determining the meaning. The synchronization and integration of multi-modal information can be directed by predefined rules or statistical models developed for different applications and tasks.

The example provided above illustrates the fact that information obtained from a single channel (e.g., voice command) often contains ambiguities. Such ambiguities could occur due to unintended multiple interpretations of the expression by the user. For example, the phrase "this area" by itself is vague unless the user provides a name that is recognized by the system. In another example, a gesture on touch screen may have different meanings. For example, moving a finger along a straight line on a touch screen that shows a map can mean drawing a line on the map or dragging the map in a particular direction. The multi-modal synchronization module makes use of the information from all the utilized modalities to provide the most likely interpretation of the user input. When an ambiguity is detected in the information obtained from a particular channel, different ways can be used at different system states. The system may use prior context to help the disambiguation, or it may ask the user for clarification from the same or different modalities. Continuing with the previous example, assume speech and touch screen are the two input modalities and user moves his or her finger on a map displayed on the touch screen. There are at least two possible interpretations of this gesture: draw a line on the map, or drag the map towards another direction. In this case, if the user says "I want to find some restaurants on this street", the system would know the user draws the line to specify a street. If the user does not say anything around that time, it is likely that the user just wants to drag the map.

The information obtained from one modality may also contain errors. These errors may come from devices, systems and even users. Furthermore, the error from one modality may also introduce inconsistency with the information from other modalities. The multi-modal synchronization and disambiguation component can resolve the inconsistency, select the correct interpretation, and recover from such errors based on the context and confidence. In one embodiment, the confidence score is calculated by including factors, such as the performance specification of the input device, the importance of a particular modality, the performance of the algorithms used to obtain information from input data, etc. When there are inconsistencies among different modalities, multiple hypotheses together with corresponding confidence scores from each modality are used to decide which ones are the likely ones to be passed to the next stage processing. The aggregated confidence score for each hypothesis is computed through a weighted linear combination of the confidence scores from different available modalities for that hypothesis or through other combination functions.

Figure 4:
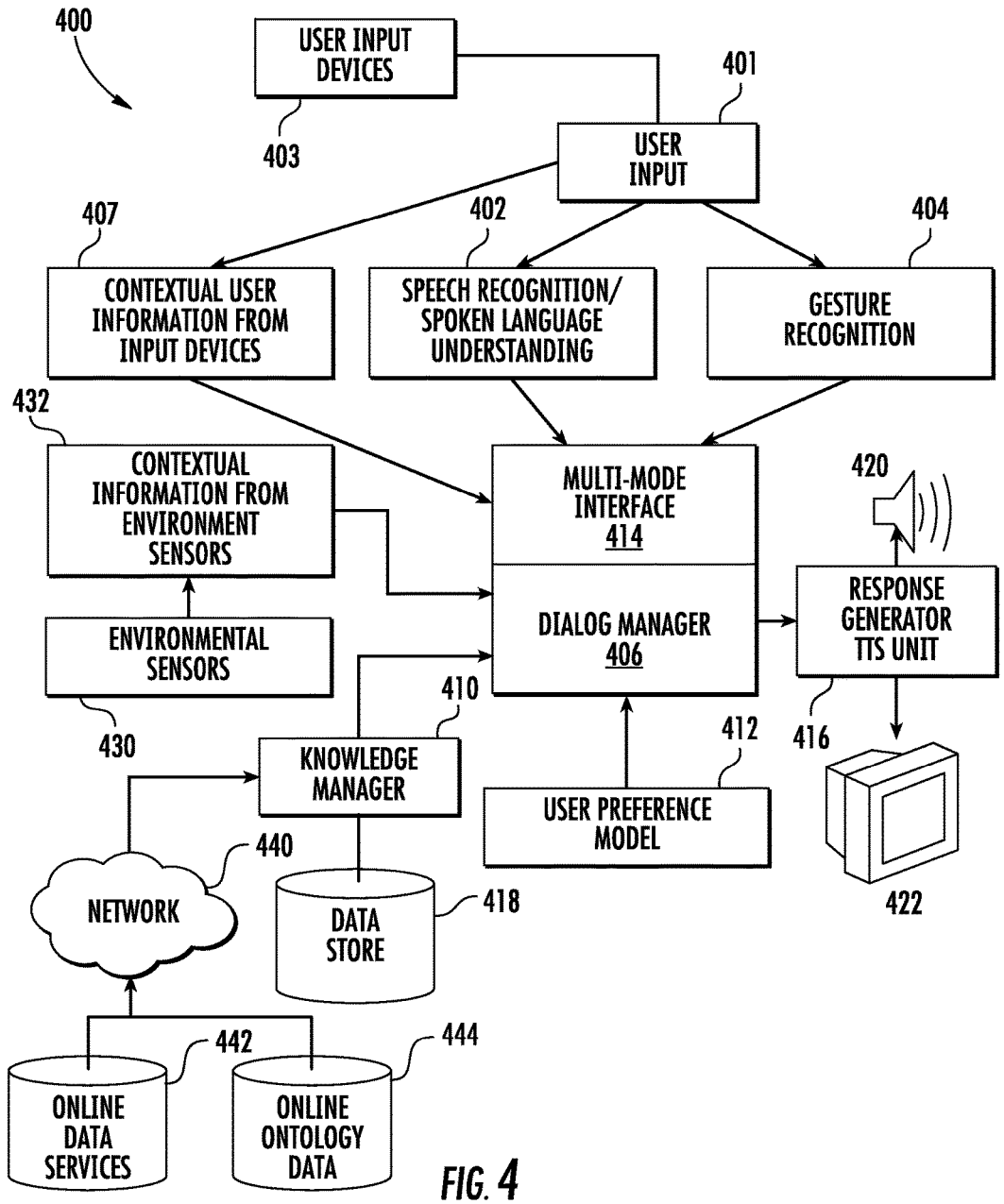
FIG. 4 is a block diagram of a spoken dialog manager system that implements a multi-modal interaction system and presents results to a user based on context of the user, the environment around the user, and a predetermined user preference model.

FIG. 4 is a block diagram of a spoken dialog system that implements a multi-modal interaction system, under an embodiment. For purposes of the present description, any of the processes executed on a processing device may also be referred to as modules or components, and may be stand-alone programs executed locally on a respective device computer, or they can be portions of a distributed client application run on one or more devices. The core components of system 400 include a spoken language understanding (SLU) module and speech recognition (SR) module 402 with multiple understanding strategies for imperfect input, an information-state-update or other kind of dialog manager (DM) 406 that handles multiple dialog threads, a knowledge manager (KM) 410 that controls access to ontology-based domain knowledge, and a data store 418 and accesses one or more online data services 442 through a data network 440. The online data services include, for example, websites and blogs that cover current events, information services such as weather and traffic monitoring services, and social network services with accounts that are registered to the particular user of the system 400. The knowledge manager 410 accesses domain based ontology data that are stored locally in the data store 418 and optionally accesses additional ontology data that are provided as online ontology data 444 that are available for access through the network 440. As described below, the information retrieving module 450 and summarization module 460 can retrieve and summarize data from different online data services based on the preferences of an individual user that are stored in the user preference model 412.

In the system 400, a plurality of user input devices 403 receive multi-modal user input data 401 from the user. In one embodiment, user input 401 including spoken words and phrases, produces acoustic waves that are received by the speech recognition unit 402. The speech recognition unit 402 can include components to provide functions, such as dynamic grammars and class-based n-grams. The recognized utterance output by speech recognition unit will be processed by spoken language understanding unit to get the semantic meaning of user's voice-based input. In the case where the user input 401 is text-based rather than voice-based, the speech recognition is bypassed and spoken language understanding unit will receive user's text-based input and generate the semantic meaning of user's text-based input. The user input devices 403 receive multi-modal user input 401 that optionally includes gestures or other physical communication means. In this case, a gesture recognition component 404 converts the recognized gestures into machine recognizable input signals. The gesture input and recognition system could be based on camera-based gesture input, laser sensors, infrared or any other mechanical or electromagnetic sensor based system. For different user interaction system embodiments, the user input devices also include cameras that track facial expressions and gestures from the user, audio input devices, touchscreens, pen input devices, keyboards, and the like.

For the embodiment of system 400, the user inputs from any of the available methods (voice, gesture, computer, etc.) are provided to a multi-modal interface module 414 that is functionally coupled to the dialog manager 404. The multi-modal interface includes one or more functional modules that perform the task of input synchronization and input disambiguation. The input synchronization function determines which input or inputs correspond to a response for a particular event, as shown in FIG. 3. The input disambiguation function resolves any ambiguity present in one or more of the inputs.

In the system 400, the user interacts with one or more computing devices, such as a mobile electronic device, in-vehicle infotainment system, and other computing devices that incorporate environmental sensors 430. The environmental sensors 430 provide data corresponding to the context of the environment around the user and the computing device (contextual information 432). For example, many smartphones include light sensors, accelerometers, gyroscopes, thermal sensors, global positioning system (GPS) devices, and other sensors that provide the smartphone with information about the environment around the smartphone. As described in more detail below, motor vehicles also include a wide range of sensors that provide information about the environment around the vehicle. The system 400 generates contextual information from the environment 432 based on the data that are received from the environmental sensors 430. The dialog manager 406 uses the contextual data to modify output messages that the user receives based on the environmental conditions that are received from the environmental sensors 430.

In the system 400, the dialog manager 406 also receives contextual user information from the input devices 407. The contextual user information includes data about the user that the input devices or other sensors in the system 400 receive in addition to the direct input from the user. For example, an input camera that captures gestures from the user for input also records facial expressions and eye movements from the user. The facial expressions indicate an emotional state of the user that can affect the output of summarized responses that a user receives from the response generator unit 416. For example, if the facial expressions of the user indicate irritation or annoyance, then the dialog manager 406 and response generator 416 generate abbreviated output responses to queries to reduce the amount of time required for the user to interact with the system 400. In another situation, if the image data of the user indicate that the user is not looking at a visual display device or is engaged in an activity that requires visual concentration, then the response generator 416 generates an audio output of the response instead of generating a video output of the response.

In the system 400, the user preference model 412 is a data profile that includes preferences for a user that the system 400 uses to control the retrieval of information using the knowledge manager 410 and the presentation of summarized results with the dialog manager 406. For example, when the system 400 receives a multi-modal input query from the user, the knowledge manager 410 retrieves data from one or more data sources including the data store 418 and the online data services 442. In one mode of operation, the system 400 presents summarized information to the user, and the system 400 receives multi-modal dialog input from the user that requests changes to the presentation or content of the summarized information.

The knowledge manager 410 retrieves information from the user preference model 412 to select a smaller set of services from a large range of the online data services 442. In one embodiment the user preference model 412 includes a stored history of websites and social media services that the user accesses on a regular basis when manually operating a web browser or other online communication software. The stored history indicates the web sites, news services, blogs, authors, and social networks that the user prefers to use when receiving information. The knowledge manager 410 uses the stored data in the user preference model 412 to select sources of information that correspond to the observed preferences of the user in the system 400. In the system 400, the user preference model 412 also stores manual preference settings that the user stores to configure the query responses and the user preference model 412 is optionally updated in response to feedback from the user to adjust the content and format of query results. The user activity history data provides a set of data for an implicit set of preferences that are incorporated into the user preference model 412. Additionally, the input from a user during operation of the system 400 provides express data about user preferences. For example, during presentation of information about sports, the system 400 receives an express request from the user to focus the report on a particular sports team or sports event. The system 400 updates the preference model based on the express request. Of course, the interest of the user may change over time and the system 400 can receive additional express requests for information to retrieve and present relevant information based on the current interests of the user.

The dialog manager 406 processes direct input from the user through the speech input devices 402, gesture input devices 404. Additionally, the dialog manager 406 receives the contextual input 407 about the user and the device context input 432 from one or more environment sensors 430 that are associated with a computing device in the system 400. The dialog manager 406 and knowledge manager 410 also select contents of output responses based on the predetermined user preference model data 412 to filter a comparatively large amount of data that are received for the query from the user into a summarized output that corresponds to the predetermined preferences of the user. Thus, the system 400 often generates different outputs to the same query for two different users based on the user preference model for each of the users. A response generator and text-to-speech (TTS) unit 416 provides the output of the system 400 and can generate audio, text and/or visual output based on the user input. Audio output, typically provided in the form of speech from the TTS unit, is played through speaker 420. Text and visual/graphic output can be displayed through a display device 422, which may execute a graphical user interface process, such as GUI 210 shown in FIG. 2. The graphical user input may also access or execute certain display programs that facilitate the display of specific information, such as maps to show places of interest, and so on. As described below, the system 400 generates responses based on both the direct input from the user, the contextual information about the user and the environment around the user, and the predetermined preferences for the user that are stored in the user preference model 412.

In one configuration, the response generator 416 generates an output corresponding to a default format for information presentation to the user. The default format is individualized to each user based on the user preference model 412. A more detailed example of a format for information presentation is provided below in FIG. 8 in the context of an in-vehicle infotainment system that incorporates the system 400. During operation, the dialog manager 406 and response generator 416 adjusts the presentation format and complexity of the information that is presented to the user based on both the environmental context information 432 and the user contextual information 407. For example, the dialog manager 406 reduces the complexity of the information that is presented to the user if the user context information indicates that the user is occupied with another task. The dialog manager 406 optionally increases the amount of information that is presented to the user if the vehicle stops before a red traffic light with certain remaining waiting time and the input sensors indicate that the user is paying attention to a video output device that is associated with the response generator 416. For example, if the user context data indicate that the user is moving or otherwise busy, the dialog manager 406 generates summarized text for output using a speech synthesis module in the response generator 416. If, however, the user is not preoccupied, the dialog manager 406 includes additional information, such as extended text passages, graphics, and video.

In a mobile embodiment, the dialog manager also modifies the complexity of information that is presented to the user based on the environmental context information from the sensors around system 400. The user optionally changes the presentation of information at any time through interaction with the dialog manager 406 using the multi-modal user input devices 403. Thus, the information presentation in the system 400 provides information to the user in a default format that is customized to the preferences and the context of the user, but the system 400 also provides an interface for user interaction if the user requests changes to the content or presentation of the information.

The multi-modal interface 414 includes one or more distributed processes within the components of system 400. For example, the synchronization function may be provided in dialog manager 404 and disambiguation processes may be provided in a SR/SLU unit 402 and gesture recognition module 404. The synchronization function synchronizes the input based on the temporal order of the input events as well as the content from the recognizers, such as speech recognizer, gesture recognizer. For example, a recognized speech "find a Chinese restaurant in this area" would prompt the system to wait an input from the gesture recognition component or search for the input in an extended proceeding period. A similar process can be expected for the speech recognizer if a gesture is recognized. In both cases, speech and gesture buffers are needed to store the speech and gesture events for an extended period. The disambiguation function disambiguates the information obtained from each modality based on the dialog context.

Figure 5:
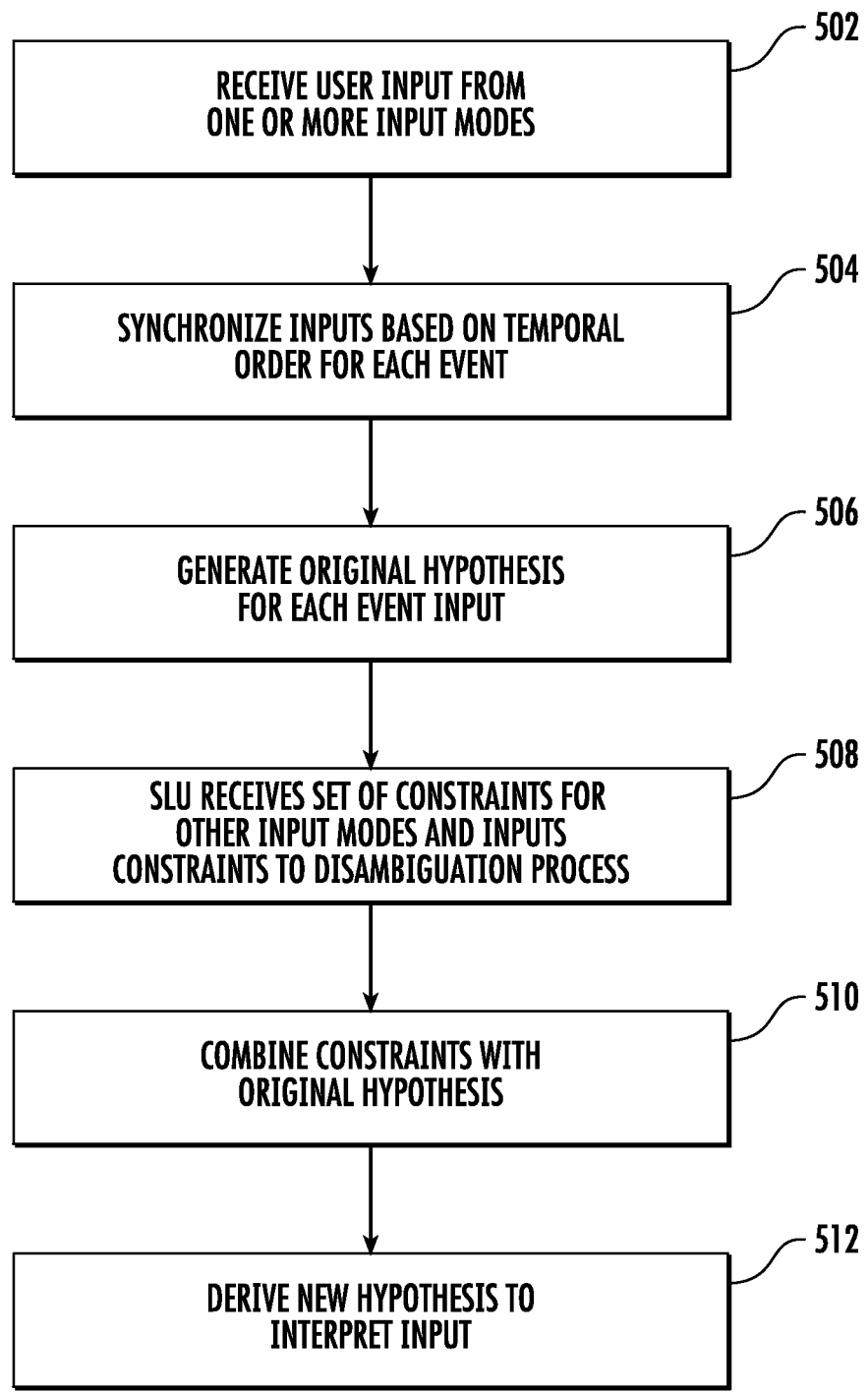
FIG. 5 is a flowchart that illustrates a method of processing user inputs in a dialog system through a multi-modal interface, under an embodiment.

FIG. 5 is a flowchart that illustrates a method of processing user inputs in a dialog system through a multi-modal interface, under an embodiment. Upon receiving an input from the one or more modalities, (block 502). The synchronization functions synchronize the input based on the temporal correspondence of the events to which the inputs may correspond (block 504). For each input, the dialog manager derives an original set of hypothesis regarding the probability of what the input means (block 506). The uncertainty in the hypothesis (H) represents an amount of ambiguity in the input. The probability of correctness for a certain hypotheses may be expressed as a weighted value (W). Thus, each input may have associated with it a hypothesis and weight (H, W). For multiple input modalities, a hypothesis matrix is generated, such as (H1 W1; H2 W2; H3 W3) for three input modalities (e.g., speech/gesture/keyboard).

In certain cases, input from a different input type or modality can help clarify the input from another modality. For example, a random gesture to a map may not clearly indicate where the user is pointing to, but if he or she also says "Palo Alto," then this spoken input can help remedy ambiguity in the gesture input, and vice-versa. The additional input is received during the disambiguation process in association with the input recognition units. During process 500, the spoken language unit receives a set of constraints from the dialog manager's interpretation of the other modal input, and provides these constraints to the disambiguation process (block 508). The constraints are then combined with the original hypothesis within the dialog manager (block 510). The dialog manager then derives new hypotheses based on the constraints that are based on the other inputs (block 512). In this manner, input from one or more other modalities is used to help determine the meaning of input from a particular input modality.

The multi-modal interface system thus provides a system and method for synchronizing and integrating multi-modal information obtained from multiple input devices, and disambiguating the input based on multi-modal information. This system and method enables a dialog system to detect and recover from errors based on multi-modal information. The system provides more flexibility and convenience to user by allowing user to input information via multiple modalities at the same time. The disambiguation and error recovery mechanisms can improve the performance and robustness of HMI systems. Embodiments of the multi-modal interface system may be used in any type of human-machine interaction (HMI) system, such as dialog systems for operating in-car devices and services; call centers, smart phones or other mobile devices. Such systems may be speech-based systems that include one or more speech recognizer components for spoken input from one or more users, or they may be gesture input, machine entry, or software application input means, or any combination thereof.

Aspects of the multi-modal synchronization and disambiguation process described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the content serving method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Figure 6:
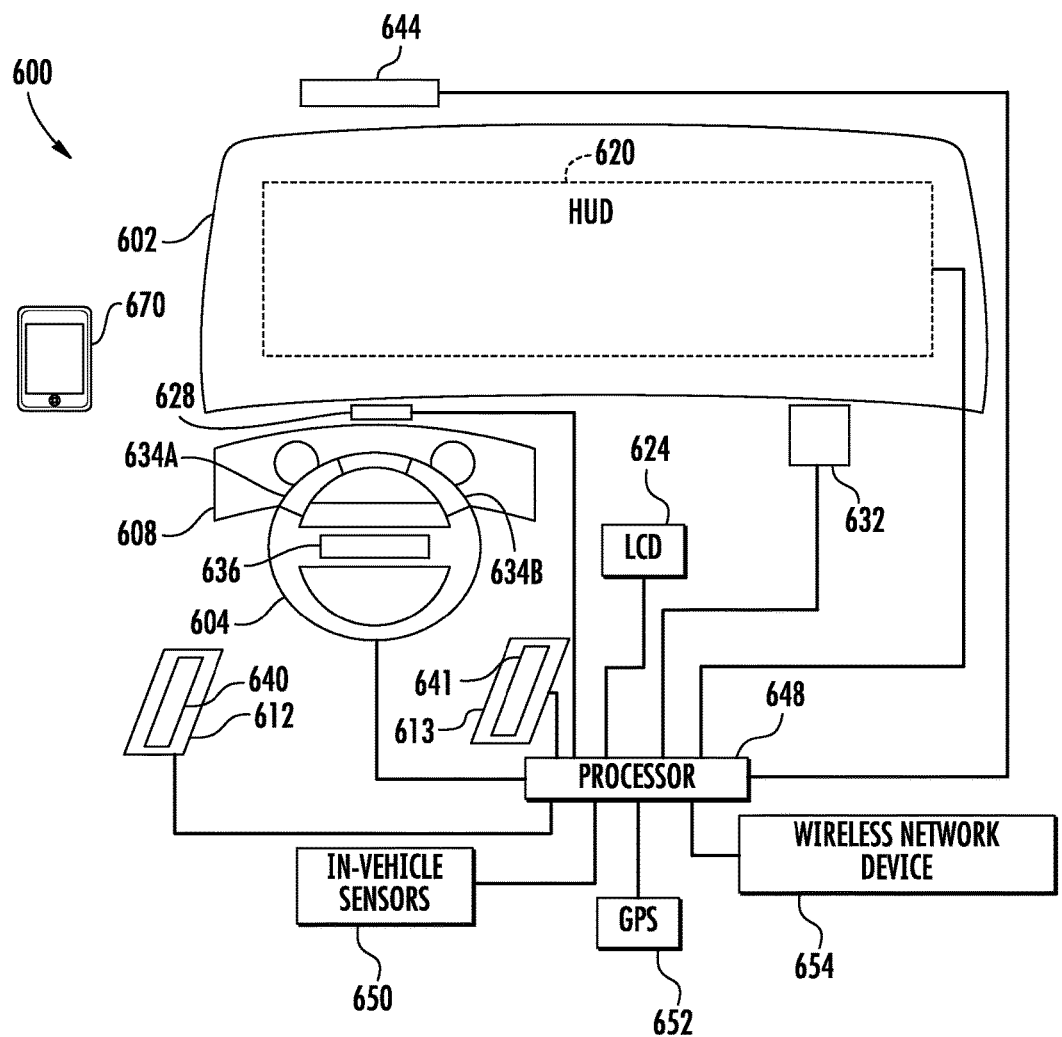
FIG. 6 is a schematic view of components of an in-vehicle infotainment system in a vehicle that presents information to a user based on user preferences and modifies the presentation of information based on user input.

FIG. 6 depicts an in-vehicle infotainment system 600 that is a specific embodiment of a human-machine interaction system found in a motor vehicle. In the environment of a vehicle, the HMI system is configured to enable a human user in the vehicle to enter requests for services through one or more input modes. The in-vehicle infotainment system 600 implements each input mode using one or more input devices. For example, as describe below, the system 600 includes multiple gesture input devices to receive gestures in a gesture input mode and a speech recognition input device to implement a speech input mode. If necessary, the in-vehicle infotainment system 600 prompts for additional information using one or more input devices to receive one or more parameters that are associated with the service request, and the in-vehicle infotainment system 600 performs requests using input data received from multiple input modalities. The in-vehicle infotainment system 600 provides an HMI system that enables the user to enter requests for both simple and complex services with reduced distraction to the user in the vehicle.

As used herein, the term "service request" refers to a single input or a series of related inputs from a user in a vehicle that an in-vehicle infotainment system receives and processes to perform a function or action on behalf of the user. Service requests to an in-vehicle infotainment system include, but are not limited to, requests to operate components in the vehicle such as entertainment systems, power seats, climate control systems, navigation systems, and the like, and requests for access to communication and network services including phone calls, text messages, and social networking communication services. Some service requests include input parameters that are required to fulfill the service request, and the user uses the input devices to supply the data for some input parameters to the system 600. Examples of interactive dialog service requests that a user provides to modify the presentation of information in an in-vehicle infotainment system are described below.

In FIG. 6, the in-vehicle infotainment system 600 includes a head-up display (HUD) 620, one or more console LCD panels 624, one or more input microphones 628, one or more output speakers 632, input regions 634A, 634B, and 636 over a steering wheel area 604, input regions 640 and 641 on nearby armrest areas 612 and 613 for one or both of left and right arms, respectively, and a motion sensing camera 644. The LCD display 624 optionally includes a touchscreen interface to receive touch input. In the system 600, the touchscreen in the LCD display 624 and the motion sensing camera 644 are gesture input devices. While FIG. 6 depicts an embodiment with a motion sensing camera 644 that identifies gestures from the user, in another embodiment the vehicle includes touch sensors that are incorporated into the steering wheel, arm rests, and other surfaces in the passenger cabin of the vehicle to receive input gestures. The motion sensing camera 644 is further configured to receive input gestures from the user that include head movements, eye movements, and three-dimensional hand movements that occur when the hand of the user is not in direct contact with the input regions 634A, 634B, 636, 640 and 641.

In the system 600, a processor 648 is operatively connected to each of the components in the in-vehicle infotainment system 600. The processor 648 includes one or more integrated circuits configured as a central processing unit (CPU), microcontroller, field programmable gate array (FPGA), application specific integrated circuit (ASIC), digital signal processor (DSP), or any other suitable digital logic device. The processor 648 also includes a memory, such as a solid state or magnetic data storage device, that stores programmed instructions for operation of the in-vehicle infotainment system 600. In the embodiment of FIG. 6, the stored instructions implement one or more software applications, input analysis software to interpret input using multiple input devices in the system 600, and software instructions to implement the functionality of the dialog manager 406 and knowledge manager 410 that are describe above with reference to FIG. 4.

In the processor 648, the memory optionally stores all or a portion of the ontology-based domain knowledge in the local-memory data store 418 of FIG. 4, while the system 600 optionally accesses a larger set of domain knowledge through networked services using one or more wireless network devices 654. In some embodiments, each ontology is associated with one information topic that the system 600 presents to the user, such as sports, politics, traffic, weather, etc. As described below, the processor 648 accesses stored ontology information for domain-specific knowledge about the properties and attributes of different information sources that the in-vehicle infotainment system 600 summarizes to present to the user. The wireless network devices 654 include, for example, wireless local area network (WLAN) transceiver including devices that use the IEEE 802.11 family of protocols or the Bluetooth family of protocols for communication with mobile computing devices that are within a short range of the vehicle, such as a smartphone 670 that is carried in the vehicle by an occupant. The wireless network device 654 also includes a wireless wide area network (WWAN) transceiver that implements a wide-area network protocol using, for example, the universal long range telecommunications system (UMTS), long term evolution (LTE), other 3G and 4G standards, or any other suitable wireless standard that provides network access to the in-vehicle infotainment system 600 to remote computing systems, including online information services, web sites, and social media networks. The memory also stores intermediate state information corresponding to the inputs that the user provides using the multi-modal input devices in the vehicle, including the speech input and gesture input devices. The wireless network device 654 may utilize smart phone or other smart devices with wireless connectivity to link to the internet.

The processor 648 connects to or incorporates additional components, such as one or more in-vehicle sensors 650, a global positioning system (GPS) receiver 652, and wireless network device 654, to provide navigation and communication with external data networks and computing devices. The in-vehicle sensors 650 include, for example, a speedometer, tachometer, environmental sensors including light sensors, humidity sensors, external radar, external parking and collision avoidance cameras, and any other sensors that provide information about the state of the vehicle and the environment around the vehicle to the processor 648. The GPS 652 also provides geographic data corresponding to the current location of the vehicle to the processor 648, and the processor 648 uses the geographic data to retrieve weather and traffic information from external data services using the wireless network device 654. The in-vehicle infotainment system 600 is integrated with conventional components that are commonly found in motor vehicles including a windshield 602, dashboard 608, and steering wheel 604.

In some operating modes, the in-vehicle infotainment system 600 operates independently, while in other operating modes, the in-vehicle infotainment system 600 interacts with a mobile electronic device, such as a smartphone 670, tablet, notebook computer, wearable computing device, or other electronic device. The in-vehicle infotainment system communicates with the smartphone 670 using a wired interface, such as USB, or a wireless interface such as Bluetooth. The in-vehicle infotainment system 600 provides a user interface that enables the user to control the smartphone 670 or another mobile electronic communication device with reduced distraction. For example, the in-vehicle infotainment system 600 provides a combined voice and gesture based interface to enable the user to make phone calls or send text messages with the smartphone 670 without requiring the user to hold or look at the smartphone 670. In some embodiments, the smartphone 670 includes various devices such as GPS and wireless networking devices that complement or replace the functionality of devices that housed in the vehicle.

In some embodiments of the system 600, the smartphone 670 or another mobile electronic device stores the user preference model 412 that is depicted in FIG. 4 in a memory of the mobile electronic device. Since the user preference model 412 corresponds to the preferences of an individual user, the personal smartphone 670 that is carried by the user stores the user preference data in a location that is accessible to the user in a wide variety of circumstances for interaction with different digital computing systems. In the system 600, the processor 648 communicates with the smartphone 670 using the wireless network device 654 to accesses the user preference data. In another embodiment, the user preference data for the user is stored in an online database in a user account that is associated with the user. The in-vehicle infotainment system 600 accesses the account using a WWAN transceiver with the wireless network device 654. The smartphone 670 optionally provides login credentials to access the user preference model that is associated with the user without requiring the user to manually enter a login and password or other authentication information.

In the system 600, the input regions 634A, 634B, 636, 640, and 641 provide a surface for a user to enter input data using hand motions or gestures. In one embodiment, the input regions include gesture sensor devices, such as infrared or Time of Flight (TOF) sensors, which identify input gestures from the user. In another embodiment, the camera 644 is mounted on the roof of the passenger compartment and views one or more of the gesture input regions 634A, 634B, 636, 640, and 641. In addition to gestures that are made while the user is in contact with a surface in the vehicle, the camera 644 records hand, arm, and head movement in a region around the driver, such as the region above the steering wheel 604.

The camera 644 generates image data corresponding to gestures that are entered when the user makes a gesture in the input regions, and optionally identifies other gestures that are performed in the field of view of the camera 644. The gestures include both two-dimensional movements, such as hand and finger movements, when the user touches a surface in the vehicle, or three-dimensional gestures when the user moves his or her hand above the steering wheel 604. In alternative embodiments, one or more sensors, which include additional cameras, radar and ultrasound transducers, pressure sensors, and magnetic sensors, are used to monitor the movement of the hands, arms, face, and other body parts of the user to identify different gestures.

On the steering wheel 604, the gesture input regions 634A and 634B are located on the top of the steering wheel 604, which a user may very conveniently access with his or her hands during operation of the vehicle. In some circumstances the user also contacts the gesture input region 636 to activate, for example, a horn in the vehicle. Additionally, the user may place an arm on one of the armrests 612 and 613. The processor 648 is configured to ignore inputs received from the gesture input regions except when the user is prompted to enter input data using the interface to prevent spurious inputs from these regions.

In some embodiments, the processor 648 is configured to identify written or typed input that is received from one of the interface regions in addition to identifying simple gestures that are performed in three dimensions within the view of the camera 644. For example, the user engages the regions 636, 640, or 641 with a finger to write characters or numbers. As a complement to the input provided by voice dialog systems, handwritten input is used for spelling an entity name such as a person name, an address with street, city, and state names, or a phone number. An auto-completion feature developed in many other applications can be used to shorten the input. In another embodiment, the processor 648 displays a 2D/3D map on the HUD and the user may zoom in/out of the map, move the map left, right, up, or down, or rotate the map with multiple fingers. In another embodiment, the processor 648 displays a simplified virtual keyboard using the HUD 620 and the user selects keys using the—input regions 636, 640, or 641 while maintaining eye contact with the environment around the vehicle through the windshield 602.

The microphone 628 generates audio data from spoken input received from the user or another vehicle passenger. The processor 648 includes hardware, such as DSPs, which process the audio data, and software components, such as speech recognition and voice dialog system software, to identify and interpret voice input, and to manage the interaction between the speaker and the in-vehicle infotainment system 600. Additionally, the processor 648 includes hardware and software components that enable generation of synthesized speech output through the speakers 632 to provide aural feedback to the driver and passengers.

The in-vehicle infotainment system 600 provides visual feedback to the user using the LCD panel 624, the HUD 620 that is projected onto the windshield 602, and through gauges, indicator lights, or additional LCD panels that are located in the dashboard 608. When the vehicle is in motion, the processor 648 optionally deactivates the LCD panel 624 or only displays a simplified output through the LCD panel 624 to reduce distraction to the user. The processor 648 displays visual feedback using the HUD 620 to enable the user to view the environment around the vehicle while receiving visual feedback. The processor 648 typically displays simplified data on the HUD 620 in a region corresponding to the peripheral vision of the user to ensure that the user has an unobstructed view of the road and environment around the vehicle.

As described above, the HUD 620 displays visual information on a portion of the windshield 620. As used herein, the term "HUD" refers generically to a wide range of head-up display devices including, but not limited to, combined head up displays (CHUDs) that include a separate combiner element, and the like. In some embodiments, the HUD 620 displays monochromatic text and graphics, while other HUD embodiments include multi-color displays. While the HUD 620 is depicted as displaying on the windshield 602, in alternative embodiments a head up unit is integrated with glasses, a helmet visor, or a reticle that the user wears during operation.

During operation, the in-vehicle infotainment system 600 receives input requests from multiple input devices, including, but not limited to, voice input received through the microphone 628, gesture input from the steering wheel position or armrest position, touchscreen LCD 624, or other control inputs such as dials, knobs, buttons, switches, and the like. After an initial input request, the processor 648 generates a secondary feedback prompt to receive additional information from the user, and the user provides the secondary information to the in-vehicle infotainment system using a different input device than was used for the initial input. The processor 648 receives multiple inputs from the user using the different input devices in the in-vehicle infotainment system 600 and provides feedback to the user using the different output devices. In some situations, the processor 648 generates multiple feedback prompts to interact with the user in an iterative manner to identify specific commands and provide specific services to the user.

In one example, while driving through a city, the user speaks to the in-vehicle infotainment system 600 to enter a question asking for a listing of restaurants in the city. In one operating mode, the HUD 620 displays a map of the city. The user then makes a gesture that corresponds to a circle on the map displayed on the HUD 620 to indicate the intended location precisely. The processor 648 subsequently generates an audio request for the user to enter a more specific request asking the user to narrow the search criteria for restaurants. For example in one configuration, the HUD 620 displays a set of icons corresponding to restaurants meeting the specified requirements. The user enters a response to the second query with a point gesture or another suitable gesture that is entered though one of the input regions 634A, 634B, 636, 640, and 641. The user maintains close contact with the steering wheel 604 and maintains eye contact with the environment around the vehicle through the windshield 602 while entering the gesture input. Thus, the in-vehicle infotainment system 600 enables the user to interact with the in-vehicle infotainment system 600 using multiple input and output devices while reducing distractions to the user. As is known in the art, multiple inputs from different input channels, such as voice, gesture, knob, and button, can be performed in flexible order, and the inputs are synchronized and integrated without imposing strict ordering constraints.

The example described above is an illustrative operation of the in-vehicle infotainment system 600, but the in-vehicle infotainment system 600 is further configured to perform a wide range of additional operations. For example, the in-vehicle infotainment system 600 enables the user to provide input to select music for playback through the speakers 632, find points of interest and navigate the vehicle to the points of interest, find a person in his/her phone book for placing a phone call, or entry of social media messages without removing his or her eyes from the road through the windshield 602. Using the input regions in the in-vehicle infotainment system 600, the user enters characters by writing on the input areas and sends the messages without requiring the user to break eye contact with the windshield 602 or requiring the user to release the steering wheel 604.

Figure 7:
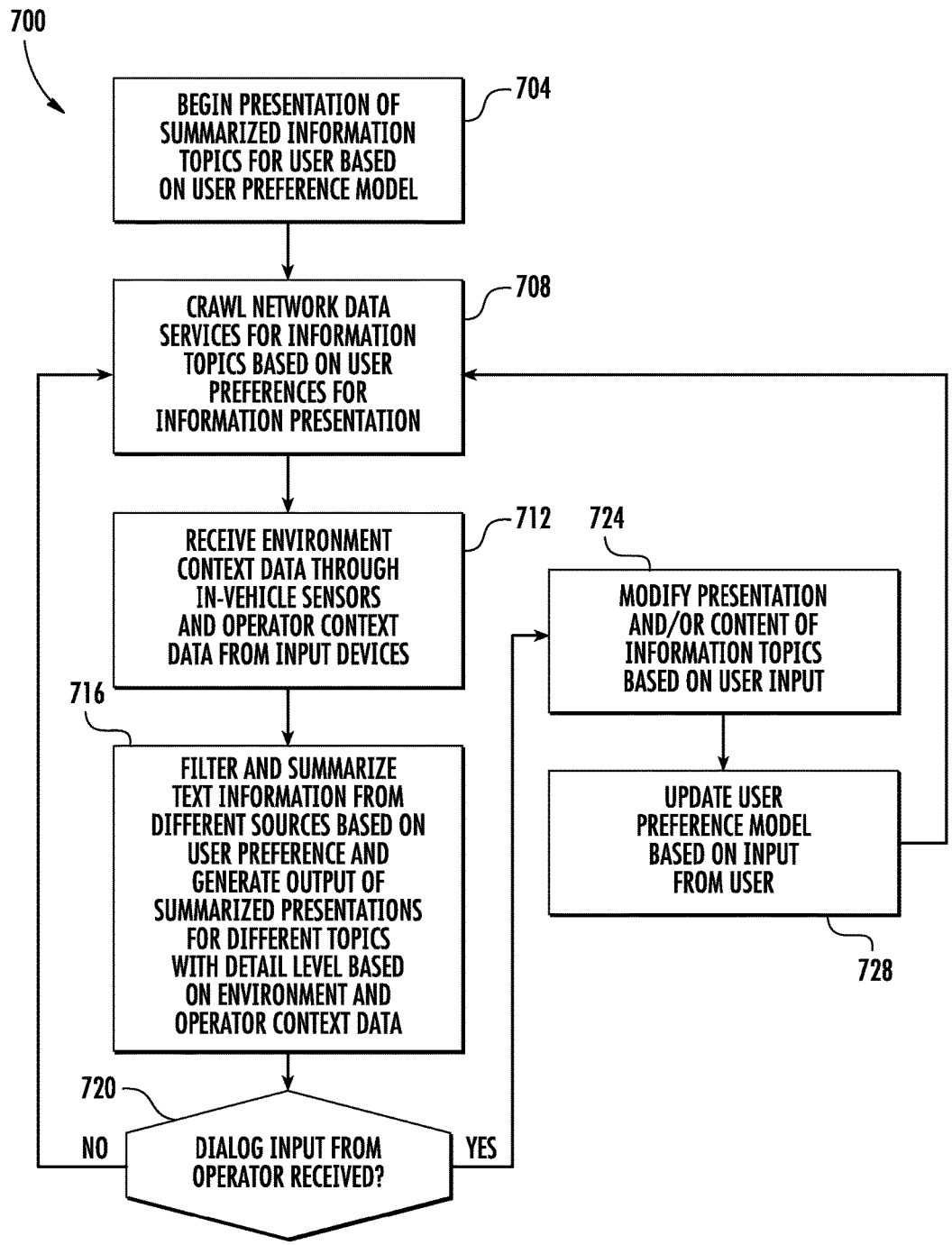
FIG. 7 is a block diagram of a process for operating an in-vehicle infotainment system to provide results to user queries based on a context of the user, the environment around the vehicle, and a predetermined user preference model that is associated with the user.

FIG. 7 depicts a process 700 for context-based interaction between a user and a device to provide the user with relevant feedback to a query. The process 700 is described in conjunction with the in-vehicle infotainment system 600 of FIG. 6 for illustrative purposes, but the process 700 can be performed using other electronic information systems including, but not limited to, mobile electronic devices such as smartphones, tablets, portable personal computers, wearable computing devices, "smart home" computing systems that are integrated with residential or commercial buildings, and the like. In the description below, a reference to the process 700 performing a function or action refers to a processor, such as one or more processors in the processor 648 or the smartphone 670, executing programmed instructions to operate one or more components to perform the function or action.

Process 700 begins as the in-vehicle infotainment system presents summarized information for a predetermined set of topics based on the individualized user preference data in the stored user preference model (block 704). As described above, the user preference model includes inferred preference information that is identified from the browsing and communication activities of the user. The inferred preferences can be identified both from the history of interactions between the user and the in-vehicle infotainment system 600, and from the interaction history between the user and other computing devices, including the smartphone 670 or other external computing devices. The inferred preferences can be identified from both implicit behavior and explicit request by the user. The predetermined information presentation format is also identified based on the express preference information that the user provides to the in-vehicle infotainment system 600.

Figure 8:
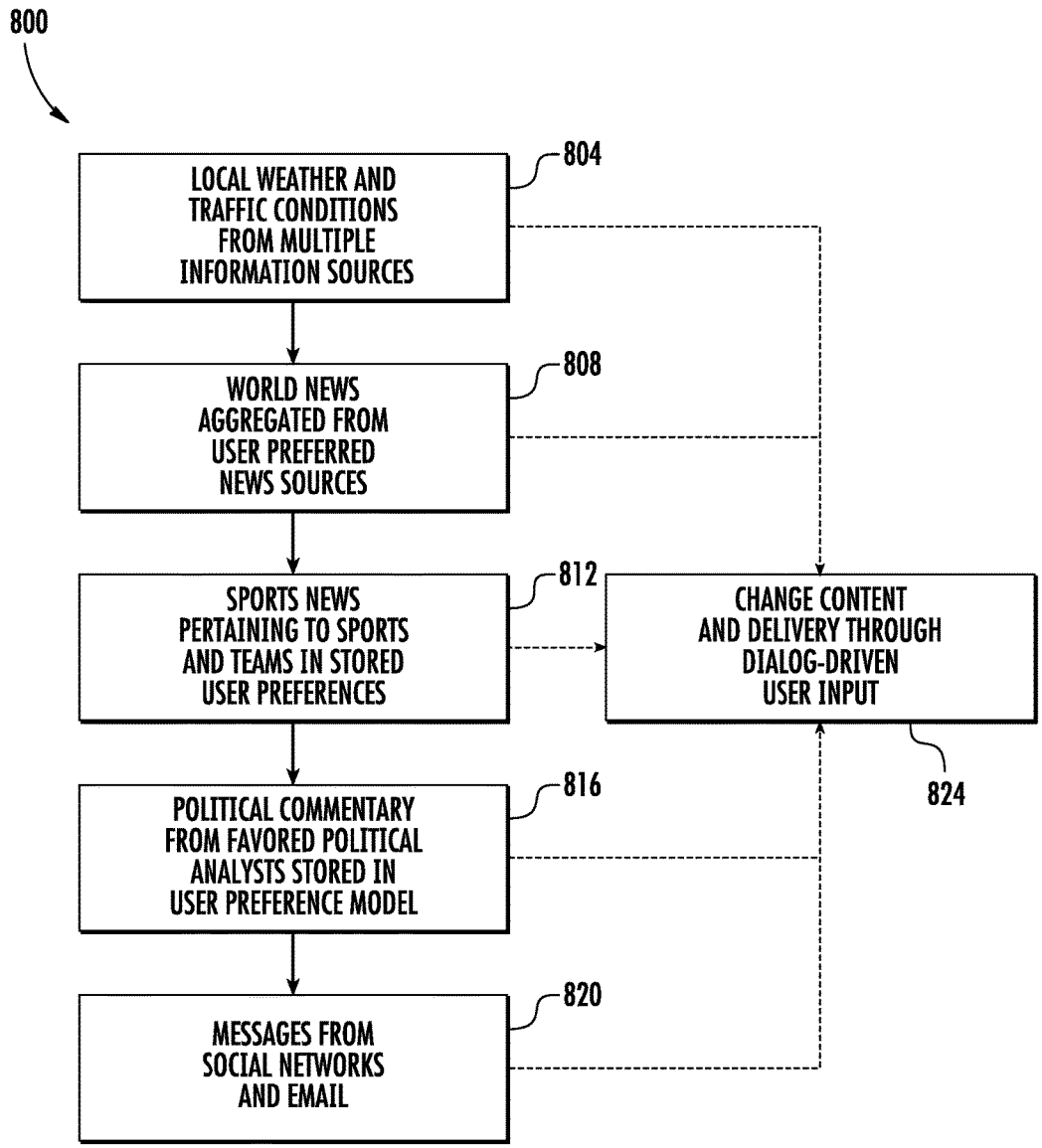
FIG. 8 is a diagram that illustrates an example default format for information presentation that is based on an individualized preference model for a user.

FIG. 8 depicts an example of a predetermined program format 800 that includes information topics that the in-vehicle infotainment system 600 presents to a user during process 700. In the illustrative example of FIG. 8, the program includes a presentation of local weather and traffic conditions 804, world news 808, sports news 812, political commentary 816, and personalized messages for the user from social media networks or email 820. While the format of the information program format 800 bears some similarity to a broadcast format used by radio or television stations, the types of content, the amount of information, and order of presentation of the topics is selected based on user preferences statically before the system starts or dynamically during the system operation. Additionally, the processor 648 searches, filters, and summarizes information from multiple information sources for each topic based on the user preference model for the user. For example, the processor 648 retrieves weather and traffic data from multiple online services and presents a summary to the user based on the location of the vehicle and optionally a driving route that the user has specified expressly or a commuter route that the user follows on a regular basis. The processor 648 filters traffic incident information that is not relevant to the route of travel for the vehicle.

The processor 648 also selects one or more news services that the user prefers based on information in the user preference model to retrieve, filter, and summarize the world news and sports news stories for presentation to the user. In the system 600, the processor 648 filters sources of information based on the user preference model to identify sources that include relevant information and optionally correspond to selected viewpoints that the user prefers to receive. For the sports news, the processor 648 also searches for news that is specific to a sport (e.g. basketball) and specific team of interest to the user. The processor 648 prioritizes the sport and team-specific news items during the summarization process for the user. The processor 648 identifies known journalists and political commentators based on the user preference model to retrieve and summarize current political commentary for the user. The processor 648 optionally uses an ontology that is stored in a local memory within the in-vehicle infotainment system 600 or accesses a remote ontology through a data network to identify the viewpoints of different information sources and filter the information sources based on the user preference model. Similar preferences are used for the retrieval and presentation of personalized messages for the user from social networks, email, or other messaging systems.

As described below, during process 700 the dialog based interface in the in-vehicle infotainment system 600 is configured to receive input from the user at any time to change the delivery of content, as depicted by the block 824 in FIG. 8. While the in-vehicle infotainment system 600 produces the program format 800 depicted in FIG. 8 without requiring user input, the in-vehicle infotainment system 600 modifies the content or delivery of information to the user based on the user input. For example, the user can request a greater or lesser detail of information about any of the topics 804-820, request additional sources of information or information from sources with opposing points of view, or even request information about a completely different topic than the topics that are present in program format 800.

Referring again to FIG. 7, the process 700 continues as the in-vehicle infotainment system 600 retrieves information from multiple sources based on the topics in the user preference model. The processor 648 generates one or more queries for online information services based on the preferences for the user in the user preference model to retrieve content data related to a topic (block 708). In some embodiments the content retrieval includes a "crawling" process where the processor 648 generates multiple queries for information from different information services to retrieve linked documents that are related to one or more topics.

For example, the processor 648 generates queries for information about a particular sports team using identification information about sports team in the user preference model and a set of sports information services that are referred to using a predetermined ontology or through an online search engine. The selected sources are optionally identified based on implicit user preferences, such as the uniform resource locators (URLs) of websites that the user visits regularly using other computing devices, or through express user input that selects one or more services. The query includes, for example, a specific keyword or key phrase that includes relevant terms from the user preference model, such as a team name, and the processor 648 retrieves query results from the selected services using the wireless network device 654. The queries also retrieve general news information from the selected services to produce a general summary of recent events in sports in addition to more detailed information about sports teams based on the user preference model for the user. In another embodiment, the processor 648 implements software that subscribes to the published information streams for the selected services, such as a "rich site summary" (RSS) feed, Atom feed, or other suitable feed of information that uses a publisher-subscriber communication scheme.

Figure 9:
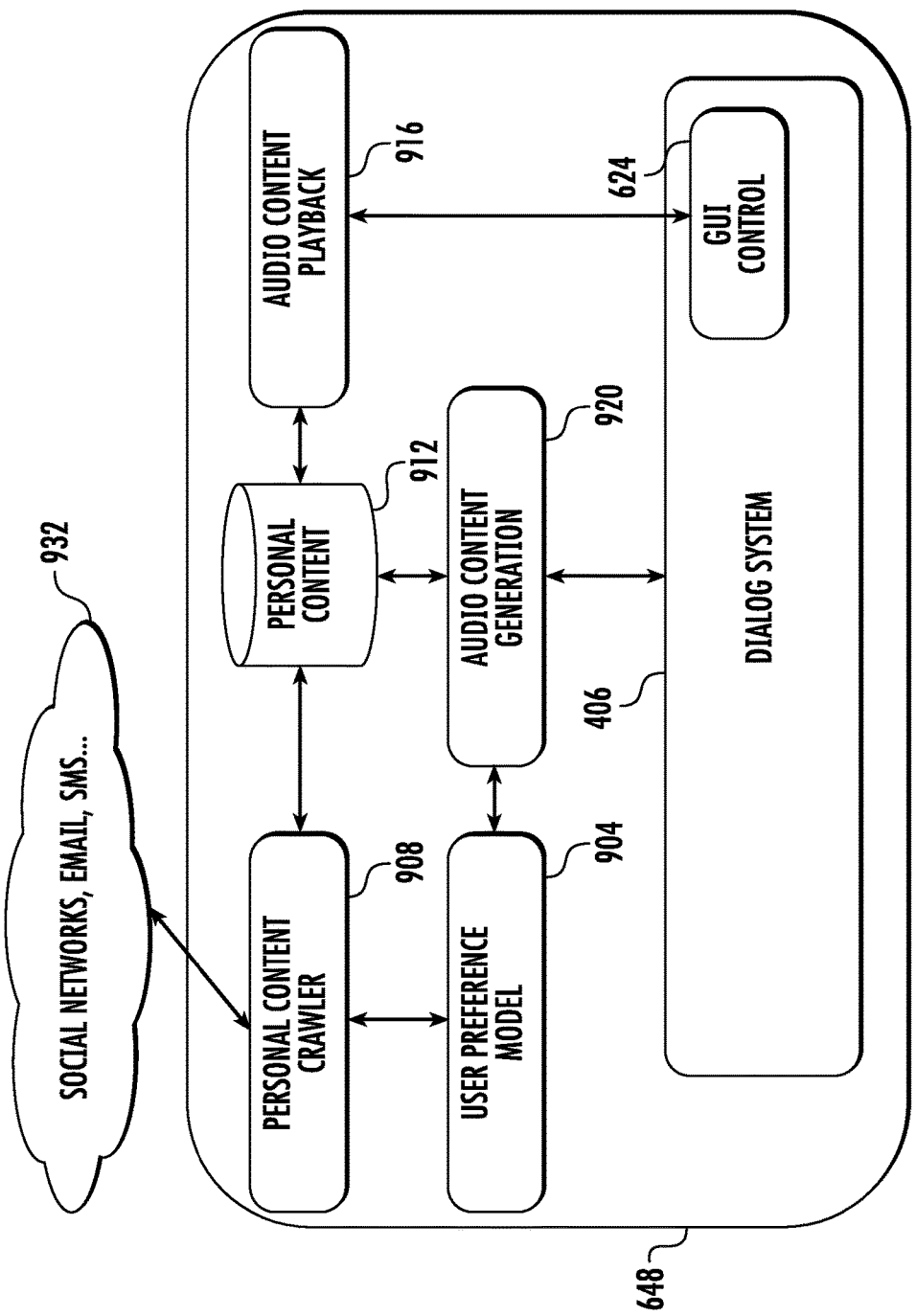
FIG. 9 is a diagram depicting the retrieval of personalized content for presentation to a user.

FIG. 9 depicts one operating mode of the system 600 for the retrieval and presentation of personal content for the user during process 700. FIG. 9 depicts the dialog manager system 406 that is implemented by the processor 648 in the system 600, as well as user preference model data 904, a personal crawler content module 908, personal content database 912, audio content playback module 916, audio content generation module 920, and a GUI controller that is implemented with the LCD display 624. The personal content includes messages and other data that are personally directed to user accounts for the user using one or more social networking, email, SMS, or other messaging services 932. In FIG. 9, the processor 648 retrieves user preference model data 904 from a memory in the vehicle or from a memory in the smartphone 670. The user preference model 904 stores data corresponding to the preferences of the user and account credentials for the user in a predetermine data format, such as the JavaScript Object Notation (JSON) format. For example, the user preference model 904 includes URLs and other identifiers for the social network and messaging services 932, usernames, and passwords or cryptographic keys that enable the processor 648 to access the social network services 932 using the wireless network device 654. The personal content crawler 908 is also configured to interact with predetermined communication protocols or public application programming interfaces (APIs) of the services 932. The processor 648 uses a personal content crawler 908 to retrieve messages and other personal content data from the social networks services 932, and the processor 648 stores the retrieved data in a personal content database 912. The personal content database 912 includes a set of personal data for the user that is available for presentation using one or more output devices in the in-vehicle infotainment system 600.

The dialog manager system 406 controls the both the playback of audio content in block 916 and the generation of audio content from the user 920. The audio content playback 916 uses a text to speech (TTS) or other audio synthesis system to generate an audio output from the messages that the personal content crawler 908 retrieves and stores in the personal content database 912. The user preference model 904 includes stored preferences for the types of messages that should be presented to the user and optionally preferences for the order of presentation (e.g. emails from a work email address first followed by personal messages from a social network account). The LCD 624 generates a GUI interface that enables the user to skip, pause, and replay the messages, or to record a new message using the audio content generation module 920. Using the multi-modal input devices in the in-vehicle infotainment system 600, the user can also input the command using voice input or gesture input. To record a new message, the dialog manager system 406 generates prompts for the user to identify a recipient of the message and a social network service or email account that is used to transmit the message. The user records the message and the audio content generation module 920 converts the message content to text, and the personal content crawler 908 transmits the message to the online service 932.

Figure 10:
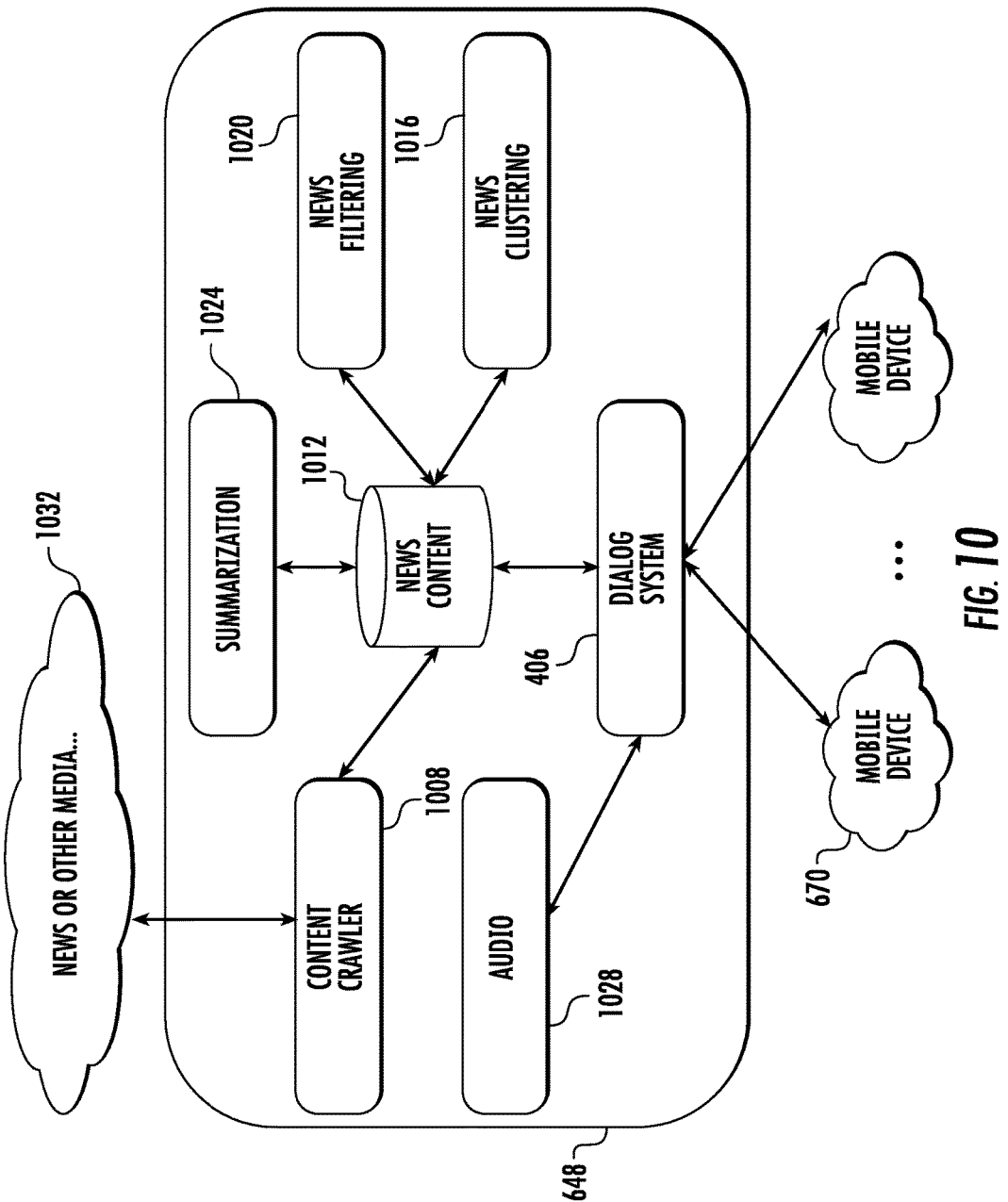
FIG. 10 is a diagram depicting a data crawling and summarization process for presenting news information to a user based on personal preferences for the user.

FIG. 10 depicts another operating mode of the in-vehicle infotainment system 600 for the retrieval and presentation of news or other information topics to the user during process 700. In FIG. 10, the in-vehicle infotainment system 600 and processor 648 implement a content crawler 1008, news content database 1012, news clustering module 1016, news filtering module 1020, audio output module 1028 and the dialog manager system 406 that is illustrated in FIG. 4. In the configuration of the FIG. 10, the content crawler 1008 retrieves data corresponding to news and current-event topics from multiple news media sources 1032, which are online websites, blogs, social media networks, wire services, and any other online source of news information.

The retrieved news story data are stored in the news content database 1012. The news clustering module 1016 uses, for example, an agglomerative clustering process or other clustering process to group content from multiple news sources together based on similarities of the content of the different news stories. The news filtering module 1020 receives the clustered groups of news stories that are related to different topics and filters the clusters based on the user preferences for each topic that is addressed in each cluster of news stories. For example, if the user preference data indicates that the user has no interest in news content that is related to the activities of television and movie actors, then news filtering module 1020 prevents the presentation of these items based on key words in the items and categorization metadata for classification of the news items. In the example of FIG. 10, the user preference data are stored in one or more mobile devices, such as the smartphone 670, and the dialog manager system 406 retrieves the user preference data for the news filtering module 1020 and summarization module 1024. The news filtering module 1020 optionally deletes filtered content from the news content database 1012. The news filtering module 1020 also organizes topics of interest to the user to present news stories related to topics of high interest to the user first.

The summarization module 1024 receives clusters of news content from the news filtering module 1020 and generates multiple summaries of each story cluster that include different levels of detail. For example, in one embodiment the summarization module 1024 generates ten distinct levels of detail for a cluster of news stories. The summarization with the least amount of detail could include, for example, a summary of the headlines from the different news items, while the most detailed summary includes extended passages from the different news stories where the summarization module consolidates redundant content in the multiple news items. The summarization module 1024 stores the multiple levels of summarized information that are associated with each news item in the news content database 1012. During operation, the dialog manager system 406 presents the different topics using a default summarization level that is stored with the user preference data.

In the example of FIG. 10, the audio output module 1028 includes a text to speech module for audio presentation of the summarized data through the speakers 632, although alternative configurations output text and multimedia data through the HUD 620 and LCD display 624. In another embodiment, the in-vehicle infotainment system 600 transmits the summarization as text or as text to speech audio data that are encoded in an audio format, such as MP3, to the mobile device 670 for presentation through the mobile device. The user optionally enters input through the multi-modal input devices in the in-vehicle infotainment system 600 to request a version of the summary that includes an increased or decreased level of detail in comparison to the default level of detail for the summarized presentation. The dialog manager system 406 receives the requests and selects a version of the summary with the requested level of detail for presentation to the user.

Referring again to FIG. 7, the processor 648 also receives environment context data and user context data (block 712) during process 700. The in-vehicle sensors 650, GPS 652, and optionally the smartphone 670 each generate data about the operational condition of the vehicle and the environment around the vehicle. The multi-modal input devices, including the gesture input camera 644, LCD touchscreen interface 624, and audio input device 628 provide context information about the activities of the user, as do some of the in-vehicle sensors 650 that identify the operation of the steering wheel 604, and the accelerator and brake pedals. The in-vehicle infotainment system 600 collects the vehicle environment context data and the user context data continuously during process 700.

Process 700 continues as the processor 648 filters and summarizes the content data that are retrieved from the different sources to generate summarized presentations each of the topics based on the environmental context of the operating vehicle and the context of the user (block 716). The processor 648 applies a filtering and summarization process to the selected data in order to present the portions of the content that are considered most relevant to the user. Part of the summarization process includes a filtering process to remove some of the content that is retrieved from the online services in situations where the volume of content is too great for reasonable presentation to the user. In one embodiment, the summarization process assigns relative relevance priorities to different pieces of text that are received from one or more information services. Thus, the processor 648 generates a summarized presentation for a topic that includes multiple sets of data with different relevance levels.

As described below, the system 600 optionally generates an output including the sets of data for the entire summarized presentation or only a portion of the sets of data that exceed a relevance threshold for the summarized data set in response to data from the in-vehicle sensors 650 or inputs received from the user. A more compact summary presentation includes only the text passages with the highest relevance, while more extensive summarizations also include additional passages that add detail. In some embodiments, the processor 648 also performs sentence compression and other text editing processes to present summarized content to the user. The summarization process also combines content from multiple sources of information into a unified presentation of information for the user. Since multiple information sources often include redundant information when describing a topic, the summarization process reduces or eliminates redundant information from the output.

In the in-vehicle infotainment system 600, the processor 648 modifies the summarization process based on both the environment context and user context data to increase or decrease the volume of information that the user receives. For example, in some instances the processor 648 generates output in an audio format in response to the environment data from the in-vehicle environment sensors 650 indicating that the vehicle is in heavy traffic or the processor 648 generates output in a video format if the in-vehicle environment sensors 650 indicate the vehicle is stopped. The processor 648 raises or lowers the relevance threshold for summarized data to modify the summarized presentation of information based on the identified context of the vehicle and the user. For example, if the environment data around the vehicle indicate that the vehicle is in heavy traffic, then the processor 648 limits the summarization process to only the passages of information having the highest relevance to provide a "headlines" overview of information in a simplified manner. The processor 648 also generates the output as audio output to reduce potential distraction to the user. Some simple pieces of information that have a high priority, such as weather or traffic alert symbols, can be displayed via the HUD 620 to provide highly condensed information with minimal distraction to the user. If, however, the environment context information indicates that the vehicle is halted and the user context data indicate that the user is paying attention to the LCD panel 624, then the processor 648 produces a more extensive set of information about each topic during the summarization process. The LCD panel 624 optionally displays more complex information such as extended text passages and graphics for the user to provide multi-modal output for the user based on the context of the vehicle and the user.

The process 700 continues as the in-vehicle infotainment system 600 retrieves data for different topics based on the user preference model data, filters and summarizes the data, and presents the summarized presentations for the topics in a predetermined forma to the user as described above with reference to the processing of blocks 704-716. The in-vehicle infotainment system 600 continues with the output of summarized presentation of information for two or more topics based on the user preference model as described above in the processing of blocks 708-716 using, for example, the presentation format 800 depicted in FIG. 8, until the user enters input via the multi-modal input interface to alter the presentation of information (block 720). The in-vehicle infotainment system 600 identifies the input using the dialog user interface system that described above in FIG. 3 and FIG. 4, and the processor 648 optionally elicits additional information from the user if the initial input is ambiguous.

The processor 648 modifies the presentation and content of the information topics that are presented to the user based on the input (block 724). For modification of the presentation of information, the processor 648 receives a predetermined input gesture or spoken command to repeat a topic, skip or truncate the presentation of a topic, or go into more detail about a particular topic based on the user input. The processor 648 bypasses the presentation of information in a topic and begins the generation of output of a summarized presentation for another topic if the user requests to skip a topic. The processor 648 reduces the required relevance threshold in the summarization process and optionally requests information from additional online data services to present additional information to the user if the user requests additional detail. The user can also identify a predetermined topic for presentation to change the order of presentation from the predetermined format. For example, in the predetermined program format 800, a user can interrupt the presentation of sports information topic 812 with a request to present the weather topic 804. Thus, the in-vehicle infotainment system 600 modifies the presentation of content based on user input.

In addition to modifying the presentation of content, the in-vehicle infotainment system 600 is configured to modify the content of presentation in response to input from the user. To change the topic of presentation for the system 600, the user requests the presentation of a different topic of information from a predetermined set of topics that the in-vehicle infotainment system 600 is configured to present. The selected topic may be on a different topic than any of the topics that are presented in the predetermined program based on the user preference model. Using the program format 800 in FIG. 8 as an example, the user may request information about local news topics even though local news topic is not part of the default program format in the user preference model.

In another example, the user requests that the in-vehicle infotainment system 600 present information from different sources than are specified in the default user preference model to present information on a topic from a different view point. For example, the default user preference model for a topic of presentation about an upcoming sporting event between two teams may include news sources that are associated with only one team that participates in the event. The user can request information about the topic from additional news sources that are associated with the other team for a different opinion about the same topic. The processor 648 references an ontology or other domain-specific knowledge about sports to identify the information sources that are commonly associated with a particular team, such as television, radio, and newspaper organizations that are in the same city as each team.

In another example, the user preference model data specifies information services or individual political commentators who are associated with a particular political viewpoint. The user request may include key words that specify a different view point, political organization, or type of commentary than the default information in the user preference model. To identify the political viewpoint of different information services or individual commentators, the processor 648 references an ontology that associates commonly used terms (e.g. "right-wing", "left-wing", "liberal", "conservative", etc.) with different online services and political commentators who agree or disagree with particular viewpoints. Additionally, terms like "neutral" or "objective" may refer to information sources that produce information about a topic with less political bias. More sophisticated statistical or symbolic algorithms may also be used to classify and select the information sources with different viewpoints. The dialog interface in the in-vehicle infotainment system 600 receives the key word input from the user, performs any required disambiguation, and presents the modified user content to the user using additional sources of information as described above with reference to the processing in blocks 708-716.

During process 700, the processor 648 modifies the user preference model that is associated with the user in response to the dialog based input from the user (block 728). The modifications to the user preference model result in changes to the default format of presentation or content of information presentation during use of the in-vehicle infotainment system 600. Using the program format 800 as an example, if the user frequently enters a request for additional information about a particular team during the summarized presentation of the sports news in block 812, then the processor 648 updates the user preference data model to include more information by default during the summarization process for topics that pertain to the identified sports team. Similarly, if the user makes repeated requests for changes to the content or sources of information for content over time, the processor 648 updates the user preference model based on the user input to present the modified content by default. Thus, during subsequent iterations of the process 700, the in-vehicle infotainment system 600 modifies the default presentation and content of information topics based on input from the user.

As described above, the in-vehicle infotainment system 600 delivers information to the user with a user-selectable level of interactivity. Unlike traditional minimally interactive systems, the user receives information in a personalized format and is free to request changes to the information delivery in an interactive manner. Unlike traditional fully interactive systems, the user is not required to retrieve information manually through a series of requests such as requesting a series of web pages or manually accessing multiple news services to retrieve information. Instead, the in-vehicle infotainment system 600 delivers relevant information that is customized to the preferences of the user and the current context of the user and the vehicle without requiring detailed user control. However, the system 600 provides a multi-modal dialog interface that enables the user to change the content and presentation of information in an interactive manner. While the process 700 is described in conjunction with the in-vehicle infotainment system 600 as an illustrative embodiment, the process 700 can be incorporated with a wide range of computing devices including, but not limited to, smartphones, wearable computers, smart home information access and device control unit, and other mobile computing devices.

It will be appreciated that variants of the above-disclosed and other features and functions, or alternatives thereof, may be desirably combined into many other different systems, applications or methods. For example, while the foregoing embodiments present an example of an in-vehicle intelligent assistant system, alternative embodiments of the information system 600 can be integrated with a wide variety of electronic devices, including mobile electronic communication devices and power tools, or smart home information access and device control unit, to reduce user distraction. Various presently unforeseen or unanticipated alternatives, modifications, variations or improvements may be subsequently made by those skilled in the art that are also intended to be encompassed herein as set forth in the following claims.

What is claimed:

1. A content presentation system in a motor vehicle comprising:
   a network device configured to retrieve information from a plurality of information sources through a data network;
   a memory configured to store a user preference model corresponding to a user of the content presentation system;
   plurality of output devices;
   an in-vehicle sensor configured to generate data corresponding to motion of the motor vehicle and an environment around the motor vehicle, the in-vehicle sensor comprising one or more of:
      a speedometer;
      a light sensor;
      a humidity sensor;
      an external radar; and
      an external parking and collision avoidance camera; and
   a processor operatively connected to the network device, the memory, the plurality of output devices, and the in-vehicle sensor, the processor being configured to:
      retrieve information from the plurality of information sources corresponding to a plurality of predetermined topics with reference to the user preference model;
      generate a plurality of summarized presentations of the information for each topic in the plurality of topics each summarized presentation including a level of detail that is selected based on at least one of the motion of the motor vehicle and the level of traffic around the motor vehicle that are detected using the in-vehicle sensor; and
      generate an output with at least one of the plurality of output devices for the plurality of summarized presentations for the plurality of topics with at least one output device in the plurality of output devices selected based on at least one of the motion of the motor vehicle and the level of traffic around the motor vehicle in a predetermined format for the user with reference to the user preference model.

2. The content presentation system of claim 1, the processor being further configured to:
   generate the output of a first summarized presentation in the plurality of summarized presentations with an audio output device in the plurality of output devices and a second summarized presentation in the plurality of presentations with a head up display (HUD) in the plurality of output devices in response to detection of a heavy traffic level around the motor vehicle.

3. The content presentation system of claim 1, the processor being further configured to:
   generate the output of the plurality of summarized presentations with an LCD panel video output device in the plurality of output devices in response to detection that the motor vehicle is halted.

4. The content presentation system of claim 1, the processor being further configured to:
   generate one summarized presentation in the plurality of summarized presentations including a plurality of summarized sets of data corresponding to a plurality of relevance levels;
   set a relevance threshold with reference to the data corresponding to at least one of the level of traffic around the motor vehicle and the motion of the motor vehicle; and
   generate the output of the one summarized presentation including only a portion of the plurality of summarized sets of data corresponding to a relevance level that exceeds the relevance threshold.

5. The content presentation system of claim 1 further comprising:
   an input device configured to receive input from the user; and
   the processor being operatively connected to the input device and further configured to:
      receive the input from the user with the user input device during generation of the plurality of summarized outputs with the output device; and
      adjust the predetermined format of the plurality of summarized outputs with reference to the input from the user.

6. The content presentation system of claim 5, the processor being further configured to:
   truncate the output of one summarized presentation in the plurality of summarized presentations in response to the input from the user; and
   begin output of another summarized presentation in the plurality of summarized presentations in response to the input from the user.

7. A method of presenting content in a content presentation system in a motor vehicle comprising:
   retrieving with a network device information from a plurality of information sources corresponding to a plurality of predetermined topics with reference to a user preference model stored in a memory;
   receiving data corresponding to at least one of a motion of the motor vehicle and an environment around the motor vehicle with an with an in-vehicle sensor comprising one or more of:
      a speedometer;
      a light sensor;
      a humidity sensor;
      an external radar; and
      an external parking and collision avoidance camera;
   generating with a processor a plurality of summarized presentations of the information for each topic in the plurality of topics, each summarized presentation including a level of detail that is selected based on at least one of the motion of the motor vehicle and the level of traffic around the motor vehicle that are detected using the in-vehicle sensor; and
   generating with the processor an output for the plurality of summarized presentations for the plurality of topics with at least one output device in a plurality of output devices in the motor vehicle selected based on at least one of the motion of the motor vehicle and the level of traffic around the motor vehicle in a predetermined format for a user with reference to the user preference model.

8. The method of claim 7, the generation of the output of the plurality of summarized presentations further comprising:
   generating the output of a first summarized presentation in the plurality of summarized presentations with an audio output device in the plurality of output devices and a second summarized presentation in the plurality of presentations with a head up display (HUD) in the plurality of output devices in response to detection of a heavy traffic level around the motor vehicle.

9. The method of claim 7, the generation of the output of the plurality of summarized presentations further comprising:

generating the output of the plurality of summarized presentations with an LCD panel video output device in the plurality of output devices in response to detection that the motor vehicle is halted.

10. The method of claim 7, further comprising:

generating with the processor one summarized presentation in the plurality of summarized presentations including a plurality of summarized sets of data corresponding to a plurality of relevance levels;

setting with the processor a relevance threshold with reference to the data corresponding to at least one of the level of traffic around the motor vehicle and the motion of the motor vehicle; and generating with the processor the output of the one summarized presentation including only a portion of the plurality of summarized sets of data corresponding to a relevance level that exceeds the relevance threshold.

11. The method of claim 7 further comprising:

receiving with an input device input from the user during generation of the plurality of summarized outputs with the output device; and adjusting with the processor the predetermined format of the plurality of summarized outputs with reference to the input from the user.

12. The method of claim 11 further comprising:

truncating with the processor the output of one summarized presentation in the plurality of summarized presentations in response to the input from the user; and beginning output of another summarized presentation in the plurality of summarized presentations with the processor in response to the input from the user.

* * * * *